United States Patent [19]

Martin

[11] Patent Number: 5,337,798
[45] Date of Patent: Aug. 16, 1994

[54] FRICTION MATERIAL DISTRIBUTOR FUNNEL

[75] Inventor: Robert L. Martin, N. Charleston, S.C.

[73] Assignee: Leinweber Systems, Inc., North Charleston, S.C.

[21] Appl. No.: 43,342

[22] Filed: Apr. 6, 1993

[51] Int. Cl.⁵ .............................................. B67C 11/00
[52] U.S. Cl. ................................... 141/331; 141/312; 141/391
[58] Field of Search .............. 141/331, 344, 345, 391, 141/312

[56] References Cited

U.S. PATENT DOCUMENTS

| | | | |
|---|---|---|---|
| 1,003,047 | 9/1911 | Iruz | 141/344 |
| 1,088,633 | 2/1914 | Simmons et al. | 141/312 |
| 1,306,319 | 6/1919 | Tittle, Jr. | 141/344 X |
| 2,192,982 | 3/1940 | Meendsen | 141/312 |
| 3,750,721 | 8/1973 | Hudson | 141/317 X |
| 4,526,214 | 7/1985 | McGregor | 141/314 X |
| 4,537,013 | 8/1985 | Tetenborg et al. | 141/114 |

Primary Examiner—Ernest G. Cusick
Attorney, Agent, or Firm—Herbert L. Lerner; Laurence A. Greenberg

[57] ABSTRACT

A distributor funnel for receiving friction material and for dispensing the friction material to a mold for a friction product is disclosed. The container comprises first and second half bodies. Pivot joints connect the first and second half bodies pivotally such that they are pivotable relative to one another about a pivot axis. The two half bodies resemble a duck bill which, in a closed position, form a closed funnel receiving the friction material. The two half bodies are spring-biased into the closed position. When the two half bodies are squeezed together at the top, the friction material is dispensed at the bottom of the funnel.

6 Claims, 3 Drawing Sheets

FRICTION MATERIAL DISTRIBUTOR FUNNEL

BACKGROUND OF THE INVENTION

1. Field of the Invention

The invention pertains to a container for receiving friction material, usually friction lining powder delivered from a metering device, and for dispensing the friction material to a mold of a press for producing friction products.

In the course of the manufacture of friction products such as brake pads or clutch pads, friction powder is weighed out into a container and then evacuated from that container into a mold of a press. It is also known to pour the friction powder directly into an intermediate mold.

Depending on the material mix, it becomes necessary to level the material after it has been dispensed into the cavity. In other words, some materials have such a constistency that, unless they are distributed about the cavity chamber to a sufficient degree before the press die applies pressure, the product will not be even and/or have a density gradient which makes it a reject. An automatically even distribution of the material would thus be a great advantage over the prior art. Additionally, dust contamination from the dropping or pouring operation is a major problem in the industry. To alleviate that problem, one prior art device is provided with a plate which covers up the die cavity when the material is to be poured and a funnel stub extending into the cavity. While a dustfree environment is possible in this way, the operator cannot see the bottom of the cavity and even distribution cannot be assured.

2. Summary of the Invention

It is an object of the invention to provide a distribution funnel, which overcomes the disadvantages of the heretofore-known devices of this general type and which makes one-handed operation, accurate, dust-free dispensing and even distribution of material possible.

With the foregoing and other objects in view there is provided, in accordance with the invention, a distributor funnel for receiving friction material and for dispensing the friction material to a mold for forming a friction product, comprising first and second half bodies; each of the first and second half bodies being substantially U-shaped as seen in a longitudinal direction and having a substantially flat base portion and two mutually parallel lateral portions extending substantially perpendicularly away from the base portion; the lateral portions being substantially triangular as seen from the side; pivot means are provided for pivotally connecting the first and second half bodies such that the first and second half bodies are pivotable relative to one another about the pivot means; spring biasing means for biasing the first and second half bodies in a closed position in which the first and second half bodies form a funnel cone having a closed bottom and an open top.

The device of such dimensions allows one-handed pivoting ("squeezing") by an operator of the first body relative to the second body. Additionally, it has been found that the very simple geometric shape of the distributor is quite advantageous in terms of one-handed transportation. In other words, two filled funnel distributors may be handled simultaneously and the operator can fill two cavities at the same time.

The fact that the funnel distributor is fully inserted into the die cavity until the beak actually touches the punch cap, promotes the dust-free transfer of material to the mold. In fact, the material emanates sideways from the beak and will usually be satisfactorily distributed as soon as the material leaves the funnel distributor. If additional distribution is necessary, the operator may simply move the device sideways and/or vertically until an even distribution of the material has been attained.

Other features which are considered as characteristic for the invention are set forth in the appended claims. Although the invention is illustrated and described herein as embodied in a funnel distributor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
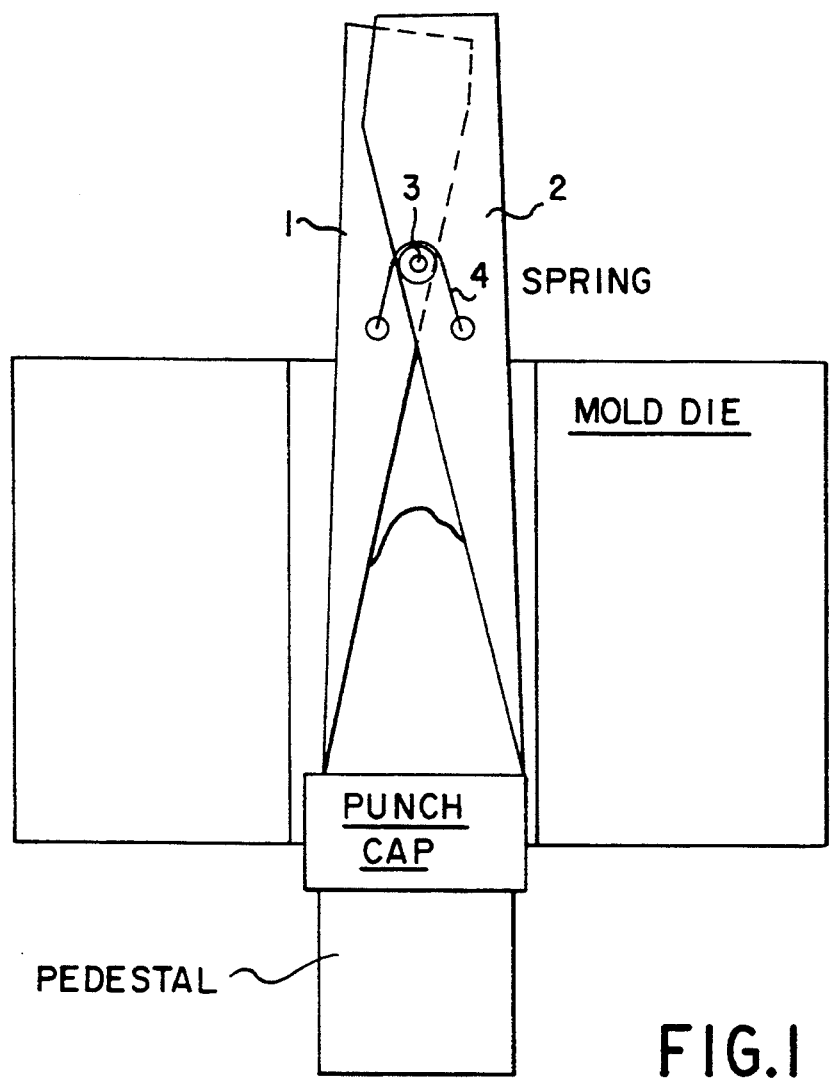
FIG. 1 is a side-elevational view of the novel funnel distributor in an open position.

Referring now to the figures of the drawing in detail and first, particularly, to FIG. 1 thereof, there is seen a container which includes two half bodies 1 and 2, which are connected and pivot about a pivot axis 3. In general terms, the two half bodies may be compared to the upper and lower half of a duck bill. The half bodies 1 and 2 are biased in a closed position by means of a spring 4, i.e. against the open position shown in FIG. 1. Accordingly, horizontal force components are being applied at the top of the distributor. The forces are applied by the operators hand.

The approximate dimensions of the distributor which apply in the context of friction powder distribution are such that height of the device is in the range of 20 cm and the top of the cone in a closed position has a width in the range of about 8 cm. Various other sizes are possible, depending on the amount of material to be dispensed and, correspondingly, the size of the cavity. As can be seen, the afore-mentioned dimensions allow one handed operation, including one-handed "squeezing" of the funnel distributor.

Figure 2:
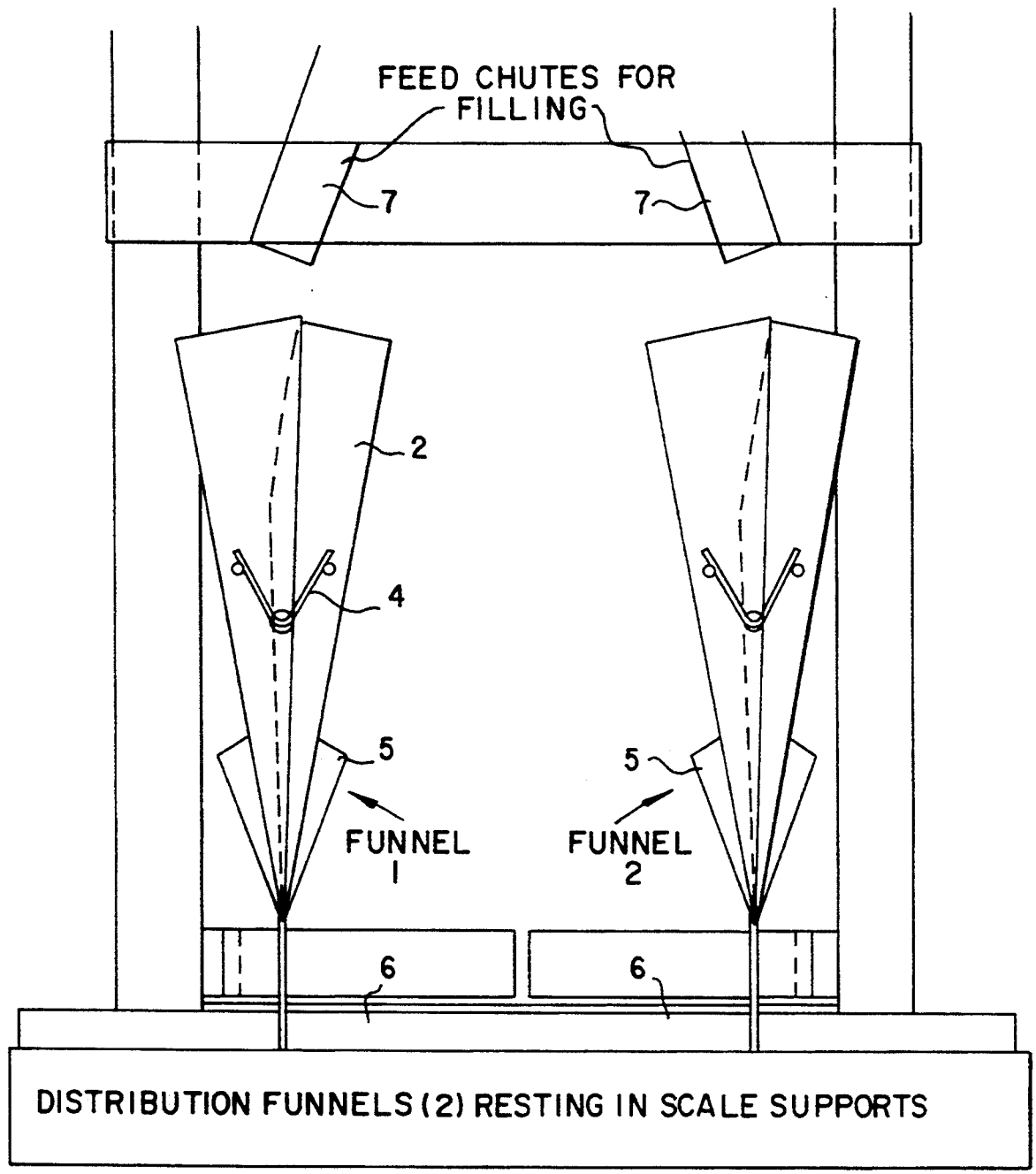
FIG. 2 is side-elevational view of two funnel distributors in a closed position shown at feed chutes where they are filled with friction powder.
Figure 3:
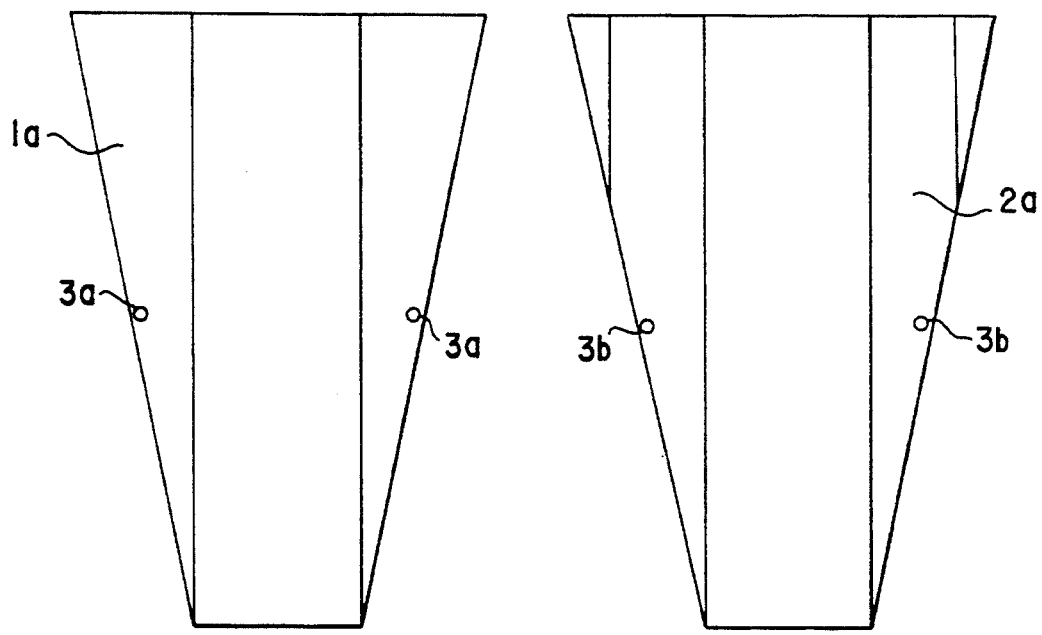
FIG. 3 is a side-elevational view of two steel plates prior to being cut and bent to become the two halves of the funnel distributor.
Figure 4:
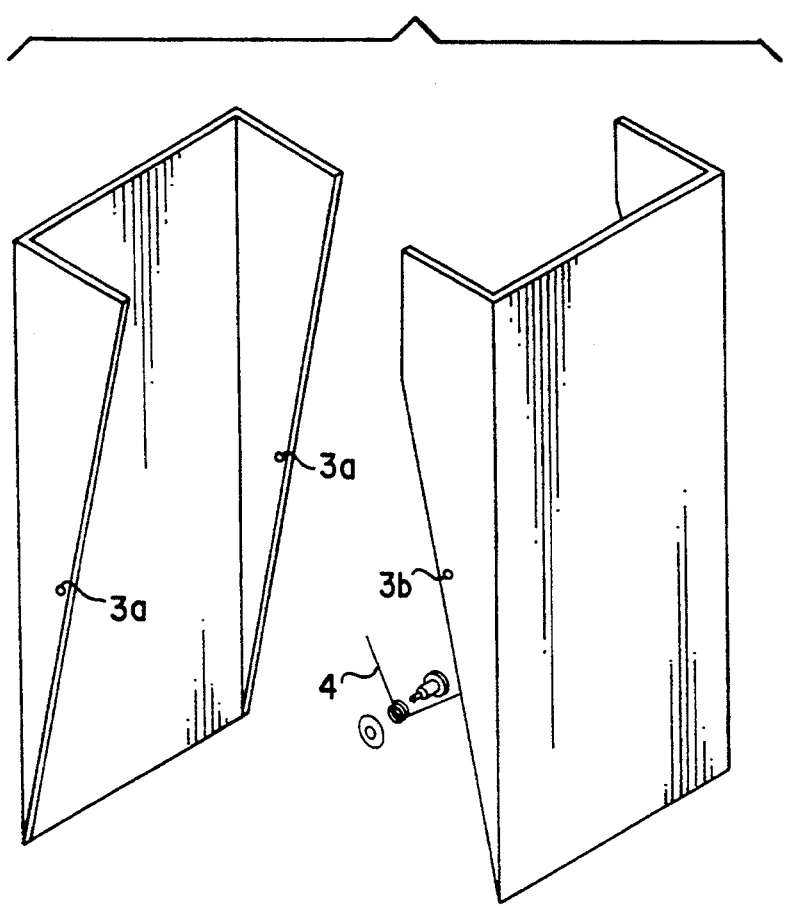
FIG. 4 is an exploded perspective view of the components of the distributor funnel.

FIG. 2 shows two funnel distributors in a closed position waiting at the filling station. The two devices rest in scale supports 5 on individual scales 6. Feed chutes 7 automatically fill the funnels. With reference to FIGS. 3 and 4, the funnel distributor of the invention essentially consists of two steel plates, bent in a certain fashion and a pivot and biasing means. Two flat steel plates 1a and 2a are first prepared. It will be understood that the plates 1a and 2a become the above-mentioned two half bodies 1 and 2, respectively. In a preferred embodiment, 23 gauge steel was used. The geometric shape of the basic plates 1a and 2a is a rectangular center portion with two right triangles laterally disposed at the long sides of the rectangle. The length of the triangle base corresponds to the long side of the rectangle. The rectangle of the plate 2a is slightly narrower than that of the plate 1a. This is necessary to allow for the later insertion of the half body 2 into the half body 1. One of the two plates, namely plate 2a is additionally cut at the triangle tip, i.e. the hypotenuse is flattened, so as to provide for the required pivotability when the two half bodies 1 and 2 are assembled.

Openings 3a and 3b are then drilled into each of the sides 1a and 2a. It is noted that, in a preferred embodiment, the opening 3a is drilled into the plate 1a at a slightly higher position than the opening 3b.

After the openings 3a and 3b have been drilled, the plates 1a and 2a are bent at the connecting line between the rectangles and the triangles. The bend angle is 90° and the radius of the bend curvature is preferably kept very small. The plates 1a and 2a have now become the half bodies 1 and 2, respectively.

The two bodies 1 and 2 are now assembled by providing bolts through the openings 3a and 3b. The spring 4 is inserted as well to provide for the necessary closing bias. The spring 4 is similar to that provided in a clothes hanger. It will be understood that, while one spring per funnel distributor may suffice, the preferred embodiment will be provided with two springs 4.

The spring constant of the spring 4 will be chosen such that a full distributor funnel, when it is taken from the stand in the scale support, will keep the device closed. On the other hand, easy pivotability must be assured as well. As mentioned above, the evacuation of the container is effected by a "squeezing" at the top of the funnel. The two half-bodies are thus pivoted into opposite angular directions, and the beak will open. The friction lining powder can emerge from the opened beak and flow outward and/or downward into a press mold, for example a hot press.

For a better understanding of the utilization of the distributor funnel according to the invention, the following exemplary process is described: The operation starts with two funnels 1, 2 resting in the dual V-type support 5 on the scale platform 6. The mix is fed into the top of each of the two funnels 1, 2 from the feed chutes 7 until the proper weight of material is achieved.

The press operator then picks up both funnels 1, 2 simultaneously and thus removes them from the V-type supports 5. Now the funnels are placed into the respective mold cavities. The funnels are inserted until the tips of the beaks touch the punch caps, i.e. the bottoms of the cavities. Then the operator squeezes each of the funnels above the pivot axis 3, again simultaneously.

The horizontal force components open the funnels fully until the bottoms are opened so that the lower edges of the half bodies touch the walls of the cavities. In other words, both funnels are opened past the point where the bases of the U-shaped half-bodies are parallel relative to one another. This means that the bottom opening is greater than the area at the level of the pivot axis and the material is thus evacuated very quickly and dependably.

Additionally, as the half bodies open, the sides are opened below the pivot point. Material is allowed to flow laterally out of the opened beak. This is extremely advantageous in terms of the distribution of the material in the cavity. The afore-described dump method virtually eliminates all dust contamination from the cavity filling process which, as mentioned above, has previously been a major problem in the industry. Material distribution in the cavity is vastly improved as well.

I claim:

1. A distributor funnel for receiving friction material and for dispensing the friction material to a mold for forming a friction product, consisting essentially of:
   first and second half bodies;
   each of said first and second half bodies being substantially U-shaped as seen in a longitudinal direction and having a substantially flat base portion and two mutually parallel lateral portions extending substantially perpendicularly away from said base portion;
   said lateral portions being substantially triangular as seen in a lateral view;
   pivot means for pivotally connecting said first and second half bodies such that said first and second half bodies are pivotable relative to one another about said pivot means;
   spring biasing means for biasing said first and second half bodies in a closed position in which said first and second half bodies form a closed funnel cone having a closed bottom, closed sides, and an open top.

2. The distributor funnel according to claim 1, wherein said pivot means allow said half bodies to be pivoted relative to one another from the closed position past a point at which said flat base portions of said first and second half bodies are oriented parallel.

3. The distributor funnel according to claim 1, wherein said pivot means allow said half bodies to be pivoted relative to one another such that a bottom opening assumes an area greater than a cross-sectional area of the funnel at a level of said pivot means.

4. A distributor funnel for receiving friction material and for dispensing the friction material to a mold for forming a friction product, comprising:
   first and second half bodies;
   each of said first and second half bodies being substantially U-shaped as seen in a longitudinal direction and having a substantially flat base portion and two mutually parallel lateral portions extending substantially perpendicularly away from said base portion;
   said lateral portions being substantially triangular as seen in a lateral view;
   pivot means for pivotally connecting said first and second half bodies such that said first and second half bodies are pivotable relative to one another about said pivot means;
   spring biasing means for biasing said first and second half bodies in a closed pivot position in which said first and second half bodies form a closed funnel cone having a closed bottom, closed sides, and an open top; and
   said half bodies forming means for receiving friction material from above and retaining the friction material in the closed pivot position and for dispensing the friction material in an open pivot position.

5. The distributor funnel according to claim 4, including means for allowing said half bodies to be pivoted relative to one another from the closed position past a point at which said flat base portions of said first and second half bodies are oriented parallel.

6. The distributor funnel according to claim 4, wherein said pivot means allow said half bodies to be pivoted relative to one another such that a bottom opening assumes an area greater than a cross-sectional area of the funnel at a level of said pivot means.

* * * * *